(12) United States Patent
Chao

(10) Patent No.: US 8,427,480 B2
(45) Date of Patent: Apr. 23, 2013

(54) METHOD FOR CALCULATING OCULAR DISTANCE

(75) Inventor: Tzu-Yi Chao, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 305 days.

(21) Appl. No.: 12/861,356

(22) Filed: Aug. 23, 2010

(65) Prior Publication Data

US 2011/0279449 A1   Nov. 17, 2011

(30) Foreign Application Priority Data

May 14, 2010   (TW) ............................... 99115586 A

(51) Int. Cl.
*G06T 11/20* (2006.01)
*A61B 3/10* (2006.01)
*A61B 3/00* (2006.01)
*G02B 27/14* (2006.01)

(52) U.S. Cl.
USPC ............ 345/440; 351/204; 351/246; 359/630

(58) Field of Classification Search ................... 345/440
See application file for complete search history.

(56) References Cited

U.S. PATENT DOCUMENTS 6,152,563 A * 11/2000 Hutchinson et al. .......... 351/209

FOREIGN PATENT DOCUMENTS

JP    2004049680 A  *  2/2004

OTHER PUBLICATIONS

Duchowski et al., 2001. Binocular eye tracking in VR for visual inspection training. In Proceedings of the ACM symposium on Virtual reality software and technology (VRST '01). ACM, New York, NY, USA, 1-8.*

* cited by examiner

*Primary Examiner* — Ulka Chauhan
*Assistant Examiner* — Sae Won Yoon
(74) *Attorney, Agent, or Firm* — Morris Manning & Martin LLP; Tim Tingkang Xia, Esq.

(57) ABSTRACT

A method for calculating an ocular distance is presented. The method includes the following steps. A three-dimensional (3D) image display device generates one or more second display points and displays one or more virtual reference points. One or more calibration points are obtained, and these calibration points are generated through interaction by a user using an interaction component with the reference points. An ocular distance of the user is calculated according to a relative position between the display points, the calibration points, and the user.

2 Claims, 7 Drawing Sheets

METHOD FOR CALCULATING OCULAR DISTANCE

CROSS-REFERENCE TO RELATED APPLICATIONS

This non-provisional application claims priority under 35 U.S.C. §119(a) on Patent Application No(s). 099115586 filed in Taiwan, R.O.C. on May 14, 2010, the entire contents of which are hereby incorporated by reference.

BACKGROUND OF THE INVENTION

1. Field of Invention

The present invention relates to a method for calculating an ocular distance, and more particularly to a method for calculating an ocular distance that is applicable to a three-dimensional (3D) image and thus to an interaction system.

2. Related Art

In recent years, applications of 3D images in the entertainment industry are developed rapidly, and all kinds of 3D image technologies have been gradually introduced into lives of ordinary people.

The imaging principle of the 3D image is that, the left eye and the right eye capture two images, and the brain synthesizes the two different images into a 3D image with a front to back depth of field.

Generally, the 3D image technology can be divided into a spectacle technology and a naked-eye technology. In the spectacle technology, a user needs to wear specially made spectacles to perceive different images with the left eye and the right eye through different light polarization angles or by shutter switching. In the naked-eye technology, the user can view 3D images on a screen without wearing spectacles. It can be seen by comparing the two technologies that, the spectacle technology has a longer history, and the relevant technologies are more mature; while the naked-eye technology is more convenient, but requires a higher cost.

The 3D images are also applicable to an interaction system. A user may interact with the 3D images through body movement. However, the user's perception for the position and the depth of field of the 3D images changes with the position of the user's eyes and the ocular distance. Therefore, when different users intend to use this interaction system, the ocular distances of the users must be calculated first to accurately reflect the users' real perception for the position and the depth of field of the 3D images.

SUMMARY OF THE INVENTION

In order to solve the above problems, the present invention is three methods for calculating an ocular distance.

A first method for calculating an ocular distance comprises the following steps. A 3D image display device generates a first display point and a second display point, and displays a virtual reference point. A calibration point is obtained, and the calibration point is generated through interaction by a user using an interaction component with the virtual reference point. An ocular distance of the user is calculated according to a relative position between the calibration point, the user, the first display point, and the second display point.

A second method for calculating an ocular distance comprises the following steps. A 3D image display device generates a first display point and a second display point, and displays a first virtual reference point. The 3D image display device generates a third display point and a fourth display point, and displays a second virtual reference point. A first calibration point is obtained, and the first calibration point is generated through interaction by a user using an interaction component with the first virtual reference point. A second calibration point is obtained, and the second calibration point is generated through interaction by the user using the interaction component with the second virtual reference point. An ocular distance of the user is calculated according to a relative position between the first display point, the second display point, the third display point, the fourth display point, the first calibration point, and the second calibration point.

A third method for calculating an ocular distance comprises the following steps. A 3D image display device generates a first display point and a second display point, and displays a first virtual reference point. The 3D image display device generates a third display point and a fourth display point, and displays a second virtual reference point. The 3D image display device generates a fifth display point and a sixth display point, and displays a third virtual reference point. A first calibration point is obtained, and the first calibration point is generated through interaction by a user using an interaction component with the first virtual reference point. A second calibration point is obtained, and the second calibration point is generated through interaction by the user using the interaction component with the second virtual reference point. A third calibration point is obtained, and the third calibration point is generated through interaction by the user using the interaction component with the third virtual reference point. An ocular distance of the user is calculated according to a relative position between the first display point, the second display point, the third display point, the fourth display point, the fifth display point, the sixth display point, the first calibration point, the second calibration point, and the third calibration point.

In view of the above, the ocular distance of the user can be calculated through interaction by the user using the interaction component with one or more virtual reference points.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, and the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 1:
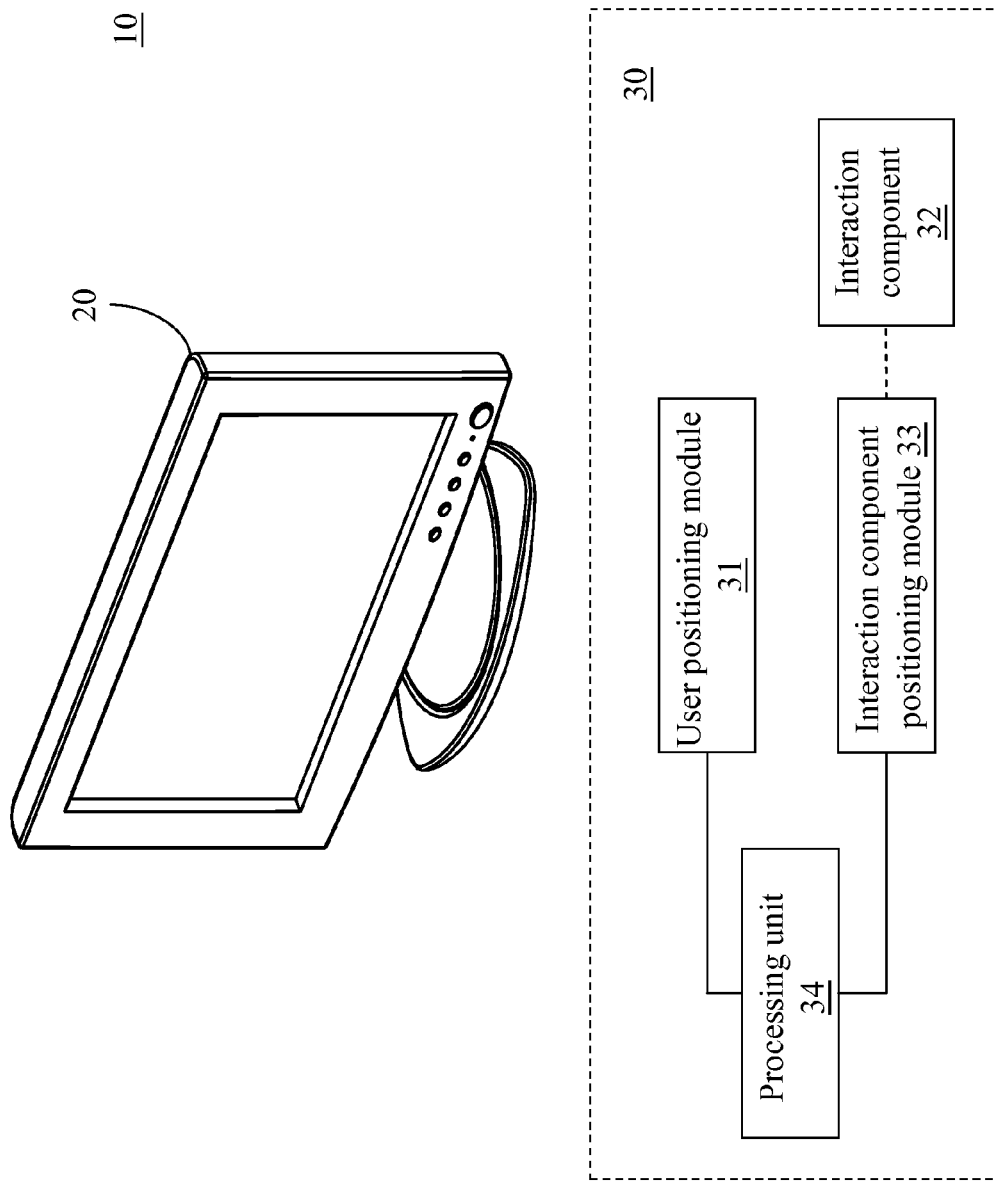
FIG. 1 is a block diagram of a 3D image interaction system according to the present invention.

FIG. 1 is a block diagram of a 3D image interaction system according to the present invention. The 3D image interaction system 10 comprises a 3D image display device 20 and an interaction module 30. The 3D image display device 20 may display a 3D image by using the naked-eye technology or the spectacle technology. The interaction module 30 comprises a user positioning module 31, an interaction component 32, an interaction component positioning module 33, and a processing unit 34. The user positioning module 31 is used to detect a position of a user. The interaction component positioning module 33 is used to detect a position of the interaction component 32. The processing unit 34 may be a microprocessor, a microcontroller, an application-specific integrated circuit (ASIC), or a field programmable gate array (FPGA). In addition to controlling the user positioning module 31 and the interaction component positioning module 33, the processing unit 34 may also be used to implement a method for calculating an ocular distance provided in the present invention.

The method for calculating the ocular distance provided in the present invention can be divided into three categories according to different assumptions. In the first method, it is assumed that a connecting line between the two eyes is parallel with the 3D image display device 20. In the second method, it is assumed that the two eyes are at the same height. The third method is applicable to a variety of conditions. The third method is the most precise one among the three methods in terms of accuracy, while it is also the most complicated one in terms of calculation complexity.

Figure 2:
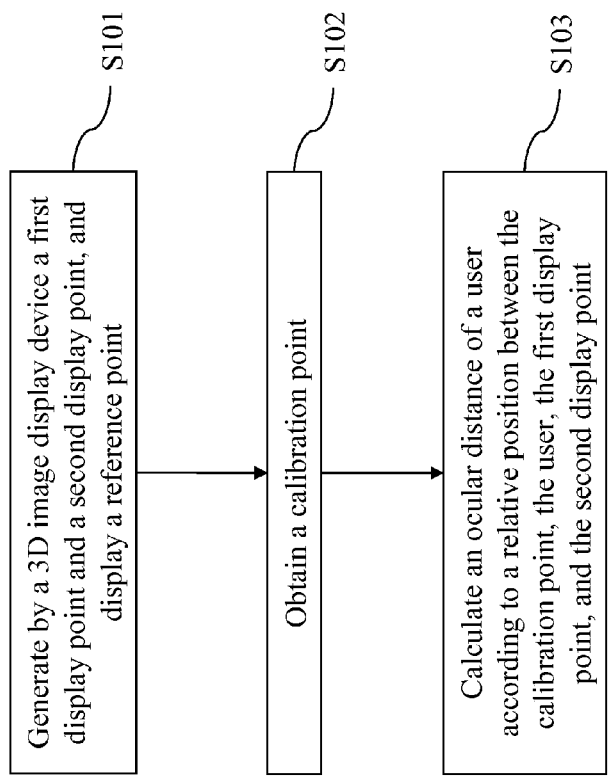
FIG. 2 is a flow chart of a first method for calculating an ocular distance according to the present invention.
Figure 3:
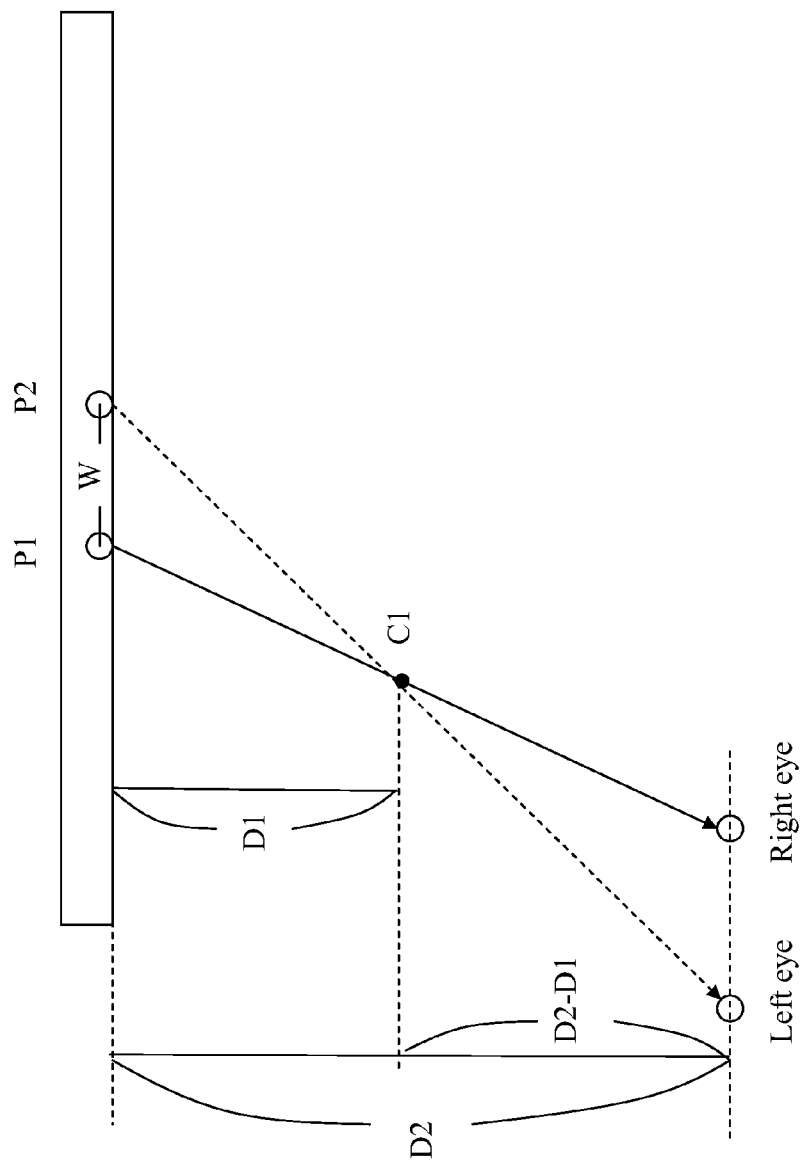
FIG. 3 is a schematic view of a relative position between a user and a 3D image display screen in the first method of the present invention.

Referring to FIG. 2 and FIG. 3, FIG. 2 is a flow chart of the first method for calculating the ocular distance, and FIG. 3 is a schematic view of a relative position between the user and a 3D image display screen in the first method.

In Step S101, the 3D image display device 20 displays a first display point P1 and a second display point P2. Positions of the first display point P1 and the second display point P2 may be default values, or may be generated at random each time. When the right eye of the user views the first display point P1 and the left eye views the second display point P2, the two points are synthesized in the brain of the user, and the user may consider that the 3D image display device 20 generates one virtual reference point.

In Step S102, a calibration point is generated through interaction by the user using the interaction component 32 with the virtual reference point. The user may point the interaction component 32 to or dispose the interaction component 32 at the position of the virtual reference point. After the user presses a button, the interaction component positioning module 33 obtains a position of a first calibration point C1.

In Step S103, a distance D1 between the first calibration point C1 and the 3D image display device 20 is calculated according to the position of the first calibration point C1. The position of the user is obtained by the user positioning module 31, and then a distance D2 between the user and the 3D image display device 20 is calculated. In addition, a distance W between the first display point P1 and the second display point P2 is calculated according to a size of the 3D image display device 20. Generally, if a resolution is a fixed value, a length or width of the screen of the 3D image display device 20 may be divided by a total number of pixels in a vertical or horizontal direction to obtain a mean distance between the pixels in the vertical or horizontal direction. When the number of pixels between the first display point P1 and the second display point P2 is known, an actual distance between the first display point P1 and the second display point P2 can be calculated accordingly.

As can be seen in FIG. 3, it is assumed that the connecting line between the two eyes is parallel with the 3D image display device 20, so that a triangle formed by the first display point P1, the second display point P2, and the first calibration point C1 and a triangle formed by the first eye, the second eye, and the first calibration point C1 are similar triangles. That is, proportions of side lengths of the two triangles are equal. Therefore, by using this property and according to the values of the distance D1, the distance D2, and the distance W, the distance between the left eye and the right eye is calculated as $(D2-D1) \div D1 \times W$.

Furthermore, coordinates of the right eye may be calculated according to the coordinates of the first display point P1 and the first calibration point C1 and the value of the distance D2. Coordinates of the left eye may be calculated according to the coordinates of the second display point P2 and the first calibration point C1 and the value of the distance D2. Subsequently, the distance between the left eye and the right eye is calculated according to the coordinates of the left eye and the right eye.

Figure 4:
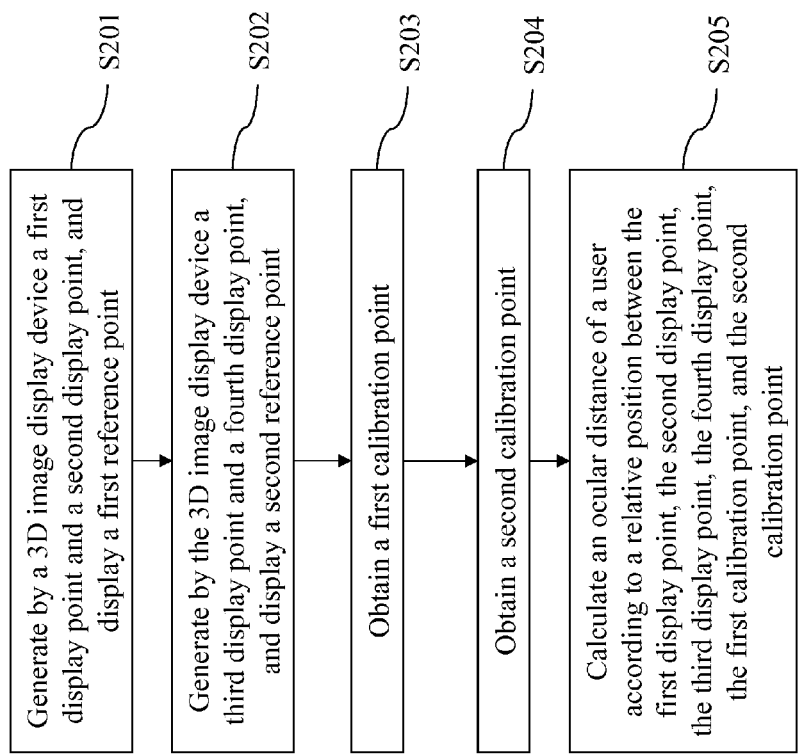
FIG. 4 is a flow chart of a second method for calculating an ocular distance according to the present invention.
Figure 5:
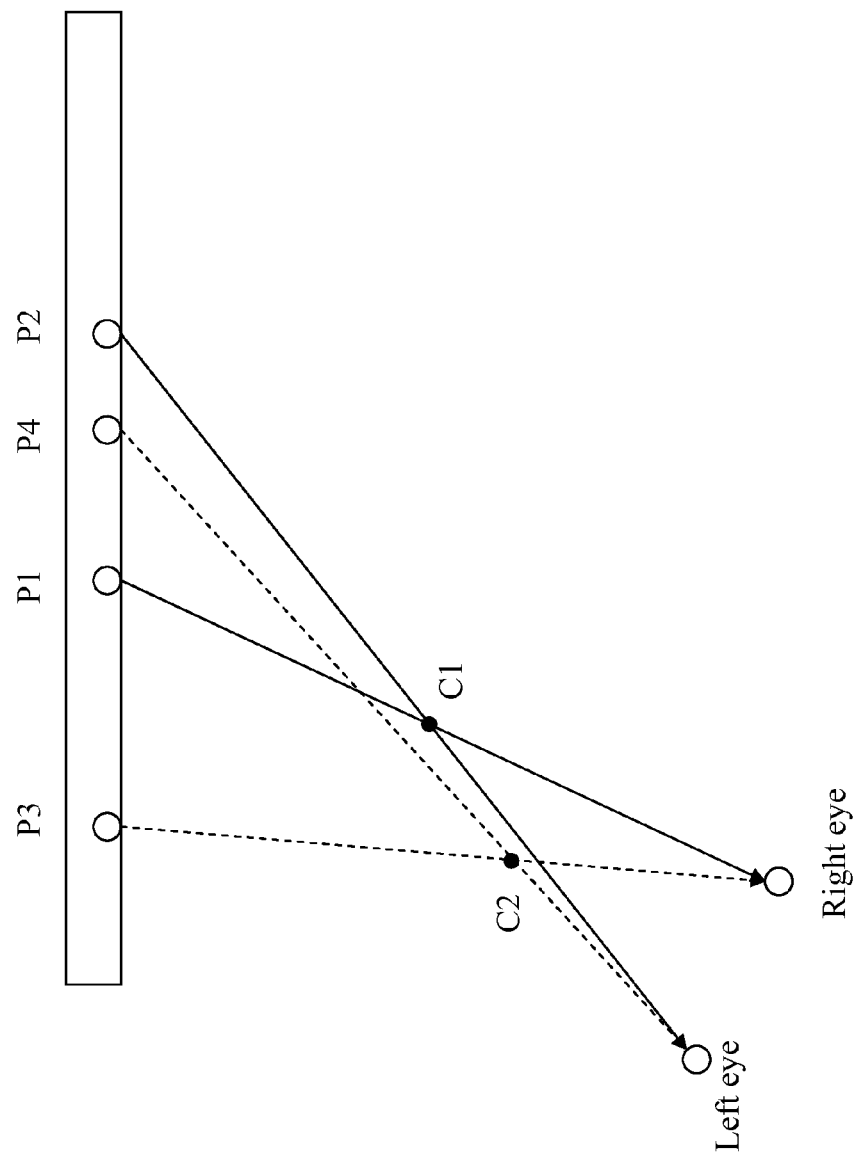
FIG. 5 is a schematic view of a relative position between the user and the 3D image display screen in the second method of the present invention.

Referring to FIG. 4 and FIG. 5, FIG. 4 is a flow chart of the second method for calculating the ocular distance, and FIG. 5 is a schematic view of a relative position between the user and the 3D image display screen in the second method.

In Step S201, the 3D image display device 20 displays a first display point P1 and a second display point P2. Positions of the first display point P1 and the second display point P2 may be default values, or may be generated at random each time. When the right eye of the user views the first display point P1 and the left eye views the second display point P2, the two points are synthesized in the brain of the user, and the user may consider that the 3D image display device 20 generates a first virtual reference point.

Step S202 is similar to Step S201, in which, the 3D image display device 20 displays a third display point P3 and a fourth display point P4. Positions of the third display point P3 and the fourth display point P4 may be default values, or may be generated at random each time. When the right eye of the user views the third display point P3 and the left eye views the fourth display point P4, the two points are synthesized in the brain of the user, and the user may consider that the 3D image display device 20 generates a second virtual reference point.

Next, in Step S203 and Step S204, the user points the interaction component 32 to or disposes the interaction component 32 at the positions of the first virtual reference point and the second virtual reference point. After the user presses different buttons or presses a single button sequentially, the interaction component positioning module 33 obtains positions of a first calibration point C1 and a second calibration point C2.

From Step S201 to Step S204, the 3D image display device 20 may generate the first virtual reference point firstly. The user may point the interaction component 32 to or dispose the interaction component 32 at the position of the first virtual reference point, and press the button to obtain the first calibration point C1. The 3D image display device 20 then generates the second virtual reference point. The user points the interaction component 32 to or disposes the interaction component 32 at the position of the second virtual reference point, and presses the button to obtain the second calibration point C2. That is, in this method, after Step S201 and Step S203 are performed, Step S202 and Step S204 are performed subsequently.

Moreover, the 3D image display device 20 may simultaneously generate the first virtual reference point and the second virtual reference point. The user may point the interaction component 32 to or dispose the interaction component 32 at the position of the first virtual reference point, and press a first button; and then point the interaction component 32 to or dispose the interaction component 32 at the position of the second virtual reference point, and press a second button. At this time, the first calibration point C1 and the second calibration point C2 can be obtained.

Finally, in Step S205, it is assumed that the left eye and the right eye are at the same height in this method, so that the distance between the left eye and the right eye can be calculated by merely obtaining two-dimensional coordinates of the left eye and the right eye.

A first linear equation is calculated according to the first display point P1 and the first calibration point C1, and a second linear equation is calculated according to the third display point P3 and the second calibration point C2. Then, a two-dimensional coordinate value of the right eye is calculated according to the first linear equation and the second linear equation. In addition, a third linear equation is calculated according to the second display point P2 and the first calibration point C1, and a fourth linear equation is calculated according to the fourth display point P4 and the second calibration point C2. Then, a two-dimensional coordinate value of the left eye is calculated according to the second linear equation and the fourth linear equation. Finally, the distance between the right eye and the left eye is calculated according to the two-dimensional coordinates of the right eye and the left eye.

Figure 6:
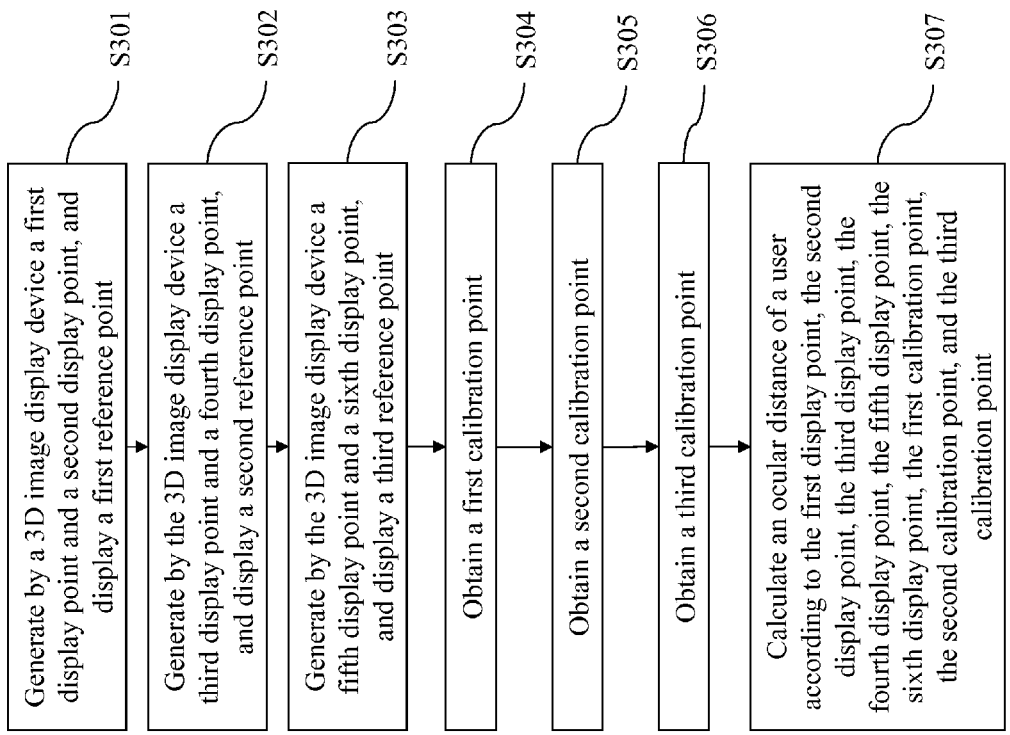
FIG. 6 is a flow chart of a third method for calculating an ocular distance according to the present invention.
Figure 7:
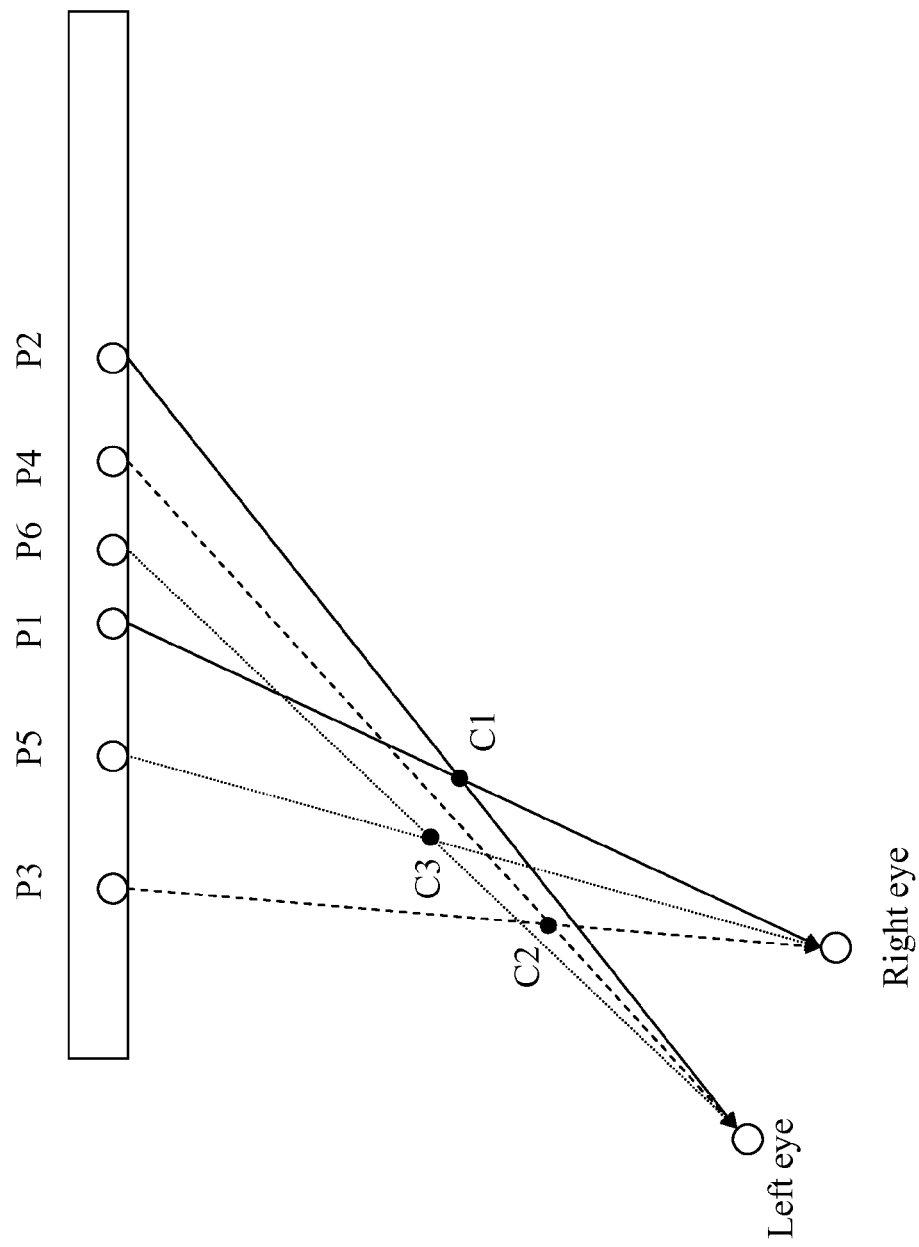
FIG. 7 is a schematic view of a relative position between the user and the 3D image display screen in the third method of the present invention.

In the above method, the ocular distance of the user is calculated when the right eye and the left eye are at the same height. However, the present invention is not limited thereto, and the ocular distance may also be calculated when the right eye and the left eye are not at the same height. Referring to FIG. 6 and FIG. 7, FIG. 6 is a flow chart of the third method for calculating the ocular distance, and FIG. 7 is a schematic view of a relative position between the user and the 3D image display screen in the third method.

In Step S301, the 3D image display device 20 displays a first display point P1 and a second display point P2. Positions of the first display point P1 and the second display point P2 may be default values, or may be generated at random each time. When the right eye of the user views the first display point P1 and the left eye views the second display point P2, the two points are synthesized in the brain of the user, and the user may consider that the 3D image display device 20 generates a first virtual reference point.

Step S302 and Step S303 are similar to Step S301, in which, the 3D image display device 20 displays a third display point P3 and a fourth display point P4, a fifth display point P5, and a sixth display point P6. Positions of the third display point P3, the fourth display point P4, the fifth display point P5, and the sixth display point P6 may be default values, or may be generated at random each time. When the right eye of the user views the third display point P3 and the left eye views the fourth display point P4, the two points are synthesized in the brain of the user, and the user may consider that the 3D image display device 20 generates a second virtual reference point. Similarly, when the right eye of the user views the fifth display point P5 and the left eye views the sixth display point P6, the two points are synthesized in the brain of the user, and the user may consider that the 3D image display device 20 generates a third virtual reference point.

Subsequently, in Step S304, Step S305, and Step S306, the user points the interaction component 32 to or disposes the interaction component 32 at the positions of the first virtual reference point, the second virtual reference point, and the third virtual reference point. After the user presses different buttons or presses a single button sequentially, the interaction component positioning module 33 obtains positions of a first calibration point C1, a second calibration point C2, and a third calibration point C3.

From Step S301 to Step S306, the 3D image display device 20 may generate the first virtual reference point firstly. The user may point the interaction component 32 to or dispose the interaction component 32 at the position of the first virtual reference point, and press the button to obtain the first calibration point C1. The 3D image display device 20 then generates the second virtual reference point. The user points the interaction component 32 to or disposes the interaction component 32 at the position of the second virtual reference point, and presses the button to obtain the second calibration point C2. Finally, the 3D image display device 20 generates the third virtual reference point. The user points the interaction component 32 to or disposes the interaction component 32 at the position of the third virtual reference point, and obtains the third calibration point C3.

That is, in this method, after Step S301 and Step S304 are performed, Step S302 and Step S305 are performed subsequently, and finally Step S303 and Step S306 are performed.

Moreover, the 3D image display device 20 may simultaneously generate the first virtual reference point, the second virtual reference point, and the third virtual reference point. The user may point the interaction component 32 to or dispose the interaction component 32 at the position of the first virtual reference point, and press the first button; then point the interaction component 32 to or dispose the interaction component 32 at the position of the second virtual reference point, and press the second button; and finally point the interaction component 32 to or dispose the interaction component 32 at the position of the third virtual reference point, and press the third button. At this time, the first calibration point C1, the second calibration point C2, and the third calibration point C3 can be obtained.

A first linear equation is calculated according to the first display point P1 and the first calibration point C1, and a second linear equation is calculated according to the third display point P3 and the second calibration point C2.

Finally, in Step S307, the first linear equation is calculated according to the first display point P1 and the first calibration point C1, the second linear equation is calculated according to the third display point P3 and the second calibration point C2, and a third linear equation is calculated according to the fifth display point P5 and the third calibration point C3. Moreover, 3D coordinates of the right eye are calculated by using the first linear equation, the second linear equation, and the third linear equation. Similarly, a fourth linear equation is calculated according to the second display point P2 and the first calibration point C1, a fifth linear equation is calculated according to the fourth display point P4 and the second calibration point C2, and a sixth linear equation is calculated according to the sixth display point P6 and the third calibration point C3. Subsequently, 3D coordinates of the left eye is calculated by using the fourth linear equation, the fifth linear equation, and the sixth linear equation.

Finally, the distance between the two eyes is calculated according to the 3D coordinates of the right eye and the 3D coordinates of the left eye.

In addition to the above three different methods, the present invention may be expanded to display four, five, or even more virtual reference points. When more than four virtual reference points are displayed, more than four calibration points can be obtained accordingly. Then, more than four equations are calculated, and 3D coordinates of the left eye and the right eye are calculated according to a least squares method. Finally, the distance between the left eye and the right eye is calculated.

In the methods of calculating the ocular distance provided in the present invention, calculation is performed according to interaction results, and calculated results are stored at the first time the user adopts the method; or calculation may be performed each time the user adopts the method.

In view of the above, in the present invention, under different conditions, the distance between the two eyes of the user is calculated through interaction by the user using the interaction component with one or more virtual reference points, so as to accurately estimate the users' real perception for the position and the depth of field of the 3D images.

What is claimed is:

1. A method for calculating an ocular distance, comprising:
   generating, by a three-dimensional (3D) image display device, a first display point and a second display point, and displaying a first virtual reference point;
   generating, by the 3D image display device, a third display point and a fourth display point, and displaying a second virtual reference point;
   obtaining a first calibration point, wherein the first calibration point is generated through interaction by a user using an interaction component with the first virtual reference point;
   obtaining a second calibration point, wherein the second calibration point is generated through interaction by the user using the interaction component with the second virtual reference point; and
   calculating the ocular distance of the user according to a relative position among the first display point, the second display point, the third display point, the fourth display point, the first calibration point and the second calibration point, wherein a coordinate of a right eye is calculated according to the first display point, the third display point, the first calibration point and the second calibration point, a coordinate of a left eye is calculated according to the second display point, the fourth display point, the first calibration point and the second calibration point, and then the ocular distance is calculated according to the coordinate of the right eye and the coordinate of the left eye.

2. A method for calculating an ocular distance, comprising:
   generating, by a three-dimensional (3D) image display device, a first display point and a second display point, and displaying a first virtual reference point;
   generating, by the 3D image display device, a third display point and a fourth display point, and displaying a second virtual reference point;
   generating, by the 3D image display device, a fifth display point and a sixth display point, and displaying a third virtual reference point;
   obtaining a first calibration point, wherein the first calibration point is generated through interaction by a user using an interaction component with the first virtual reference point;
   obtaining a second calibration point, wherein the second calibration point is generated through interaction by the user using the interaction component with the second virtual reference point;
   obtaining a third calibration point, wherein the third calibration point is generated through interaction by the user using the interaction component with the third virtual reference point; and
   calculating the ocular distance of the user according to a relative position among the first display point, the second display point, the third display point, the fourth display point, the fifth display point, the sixth display point, the first calibration point, the second calibration point and the third calibration point, wherein a coordinate of a right eye is calculated according to the first display point, the third display point, the fifth display point, the first calibration point, the second calibration point and the third calibration point, a coordinate of a left eye is calculated according to the second display point, the fourth display point, the sixth display point, the first calibration point, the second calibration point and the third calibration point, and then the ocular distance is calculated according to the coordinate of the right eye and the coordinate of the left eye.

* * * * *